Patented May 29, 1934

1,960,326

UNITED STATES PATENT OFFICE 1,960,326

PURIFICATION OF ACETYLENE

Albert Auerhahn, Heidelberg, Germany, assignor to I. G. Farbenindustrie Aktiengesellschaft, Frankfort-on-the-Main, Germany No Drawing. Application August 4, 1931, Serial No. 555,145. In Germany August 8, 1930

8 Claims. (Cl. 260—170)

The present invention relates to the purification of acetylene.

The gas mixtures obtained by the conversion in the electric arc, if desired in the presence of hydrogen, of gaseous or vaporous hydrocarbons, especially methane and its homologues, or liquid hydrocarbons in the form of mist, which hydrocarbons are hereinafter referred to as vaporized hydrocarbons, contain, in addition to acetylene, hydrogen and methane or the like, other gaseous compounds, in particular strongly unsaturated compounds such as diacetylene or allylene or allene, or in case of working in the presence of nitrogen, also cyanogen compounds, the presence of which compounds has an injurious action in the further working up of the gases containing acetylene or the acetlyene obtained therefrom, as for example into acetaldehyde.

I have now found that gas mixtures obtained by the said conversion in the electric arc of vaporized hydrocarbons, under which expression I understand also those mixtures in which one or more components have subsequently been concentrated are freed to a great extent from the said impurities, especially from diacetylene, in an advantageous manner by treating them at temperatures between 0° and 100° C. with sulphuric acid of a strength between 50 and 100 per cent. The particular temperature employed of course depends on the strength of the sulphuric acid employed and should be selected so that no acetylene is decomposed. For example with a sulphuric acid from 90 to 100 per cent strength it is preferable to operate at ordinary temperature and not to exceed a temperature of 30° C. With a sulphuric acid of from 60 to 80 per cent strength temperatures between 50° and 70° C. are employed whereas with a sulphuric acid of 50 per cent strength the temperature may be elevated to 100° C. The most satisfactory action is obtained in the case of an acid having a concentration of about 60 per cent of $H_2SO_4$ employed at a temperature of about 60° C. When the gases have been led through the acid for a short time, the acid assumes a fluorescent brown green coloration and tends to froth strongly. By adding liquid phenols to the acid in an amount of from 1 to 50 per cent with reference to the acid, the tendency to froth is removed and the phenols absorb the discoloring impurities from the acid and thus retain the purifying action of the acid. Under liquid phenols I understand all kinds of hydroxylic derivatives of benzene and its homologues, liquid at the temperature of working, containing a hydroxyl group attached to the benzene nucleus, such as phenol, or cresol or mixtures thereof, and also mixtures thereof with solid phenols such as naphtols containing the same in such amounts that the mixture remains liquid at the working temperature.

The following examples will further illustrate the nature of this invention but the invention is not restricted to these examples. The parts are by volume.

Example 1

The crude gas obtained by the conversion of methane and hydrogen in an electric arc, or the acetylene obtained therefrom is led in a state of fine dispersion with a speed of from 50 to 70 litres per hour and at a temperature of about 60° C. through 1 liter of 60 per cent sulphuric acid to which 100 cubic centimeters of crude cresol, advantageously mixed with a little alpha or beta naphtol, has been added. The gas leaving the acid is free from the diacetylene which would have injuriously affected its working up and also from other impurities, such as allylene, allene and the like.

Example 2

From 100 to 300 liters of crude gas as employed according to Example 1 are passed per hour at ordinary temperature through 1 liter of a sulphuric acid of from 90 to 100 per cent strength. The gas leaving the acid contains only very small traces of the impurities present in the initial gases.

What I claim is:

1. A process for purifying a gas containing acetylene obtained by the electric arc treatment of a vaporized hydrocarbon and which contains strongly unsaturated hydrocarbons as impurities which comprises contacting said gas with sulphuric acid having a strength between 50 and 100 per cent and to which a liquid phenol has been added at a temperature ranging between 0° and 100° C. at which the said impurities are absorbed by the said sulphuric acid but at which the acetylene remains unattacked.

2. A process for purifying a gas containing acetylene obtained by the electric arc treatment of a gas comprising a gaseous hydrocarbon of the methane series which comprises contacting said gas at a temperature between 0° and 100° C. with sulphuric acid having a strength between 50 and 100 per cent and to which a liquid phenol has been added.

3. A process for purifying a gas containing actylene obtained by the electric arc treatment of a gas mixture comprising methane and hydrogen which comprises contacting said gas at a temperature between 0° and 100° C. with sulphuric acid having a strength between 50 and 100 per cent and to which a liquid phenol has been added.

4. A process for purifying a gas containing acetylene obtained by concentration of acetylene from a gas mixture resulting from the electric arc treatment of a vaporized hydrocarbon which comprises contacting said gas at a temperature between 0° and 100° C. with sulphuric acid having a strength between 50 and 100 per cent and to which a liquid phenol has been added.

5. A process for purifying a gas containing acetylene obtained by the electric arc treatment of a gaseous hydrocarbon which comprises contacting said gas at ordinary temperature with sulphuric acid having a strength between 90 and 100 per cent and to which a liquid phenol has been added.

6. A process for purifying a gas containing acetylene obtained by the electric arc treatment of a gaseous hydrocarbon which comprises contacting said gas at a temperature between 50° and 70° C. with sulphuric acid having a strength between 60 and 80 per cent and to which a liquid phenol has been added.

7. A process for purifying a gas containing acetylene obtained by the electric arc treatment of a gaseous hydrocarbon which comprises contacting said gas at a temperature between 50° and 70° C. with sulphuric acid of about 60 per cent strength to which a liquid phenol has been added.

8. A process for purifying a gas containing acetylene obtained by the electric arc treatment of a gas mixture comprising methane and hydrogen which comprises passing said gas at a temperature between 50° and 70° C. through sulphuric acid of about 60 per cent strength to which cresol and a small amount of a naphthol has been added.

ALBERT AUERHAHN.